(12) United States Patent
Odaohhara et al.

(10) Patent No.: US 9,825,478 B2
(45) Date of Patent: Nov. 21, 2017

(54) METHOD FOR SUPPLYING POWER TO A LOAD WITHIN A PORTABLE ELECTRONIC DEVICE

(71) Applicant: LENOVO (SINGAPORE) PTE. LTD., Singapore (SG)

(72) Inventors: Shigefumi Odaohhara, Kanagawa-ken (JP); Nozomu Nagata, Kanagawa-ken (JP)

(73) Assignee: LENOVO (SINGAPORE) PTD LTE, Singapore (SG)

( * ) Notice: Subject to any disclaimer, the term of this patent is extended or adjusted under 35 U.S.C. 154(b) by 276 days.

(21) Appl. No.: 14/691,010

(22) Filed: Apr. 20, 2015

(65) Prior Publication Data

US 2015/0311738 A1    Oct. 29, 2015

(30) Foreign Application Priority Data

Apr. 23, 2014    (JP) .................. 2014-089019

(51) Int. Cl.
*H02J 7/00* (2006.01)
*H02J 7/34* (2006.01)

(52) U.S. Cl.
CPC .......... *H02J 7/0063* (2013.01); *H02J 7/0052* (2013.01); *H02J 7/0068* (2013.01); *H02J 7/34* (2013.01)

(58) Field of Classification Search
CPC .......... H02J 7/0063; H02J 7/34; H02J 7/0068; H02J 7/0052

(Continued)

(56) References Cited

U.S. PATENT DOCUMENTS 5,161,097 A * 11/1992 Ikeda .............. G05F 1/563
                                              323/222
5,440,221 A *  8/1995 Landau ........... G01R 31/3613
                                              320/155

(Continued)

FOREIGN PATENT DOCUMENTS

JP    05-49179    2/1993
JP    05-137267   6/1993

(Continued)

*Primary Examiner* — Robert Grant
*Assistant Examiner* — John Trischler
(74) *Attorney, Agent, or Firm* — Antony P. Ng; Russell Ng PLLC

(57) ABSTRACT

A power system within a portable electronic device is disclosed. In order to discharge electricity stored in a rechargeable battery within the portable electronic device to a discharge cutoff voltage, a charge booster charges the rechargeable battery with electric power coming from an AC/DC adaptor. When the AC/DC adaptor is detached, the charge booster performs boosting operation to supply power to a load from the rechargeable battery. The charge booster operates only when input voltage of the load decreases. A direct discharge circuit operates in conjunction with the charge booster, and when the charge booster does not perform any boosting operation, electric power is supplied directly from the rechargeable battery to a DC/DC converter. The charge booster can keep the input voltage of the DC/DC converter until the voltage reaches a discharge cutoff voltage of the rechargeable battery, and then stops operation when electric power is being supplied from the direct discharge circuit.

14 Claims, 4 Drawing Sheets

(58) Field of Classification Search
USPC .................................................... 320/128
See application file for complete search history.

(56) References Cited

U.S. PATENT DOCUMENTS

| | | | | |
|---|---|---|---|---|
| 5,514,946 A * | 5/1996 | Lin | G01R 31/3655 | 320/150 |
| 5,539,298 A * | 7/1996 | Perkins | H02J 7/0093 | 320/106 |
| 5,570,004 A * | 10/1996 | Shibata | G05F 1/56 | 323/274 |
| 5,633,573 A * | 5/1997 | van Phuoc | G01R 31/3655 | 320/128 |
| 5,789,899 A * | 8/1998 | van Phuoc | G01R 31/3655 | 320/112 |
| 6,074,775 A * | 6/2000 | Gartstein | H01M 2/12 | 429/53 |
| 6,118,248 A * | 9/2000 | Gartstein | H01M 10/4257 | 320/107 |
| 6,163,131 A * | 12/2000 | Gartstein | H02J 7/025 | 320/118 |
| 6,198,250 B1 * | 3/2001 | Gartstein | H01M 10/425 | 320/112 |
| 6,414,403 B2 * | 7/2002 | Kitagawa | H02J 7/0068 | 307/66 |
| 6,835,491 B2 * | 12/2004 | Gartstein | H01M 6/5044 | 320/132 |
| 6,882,130 B2 * | 4/2005 | Handa | H02J 7/0065 | 320/135 |
| 7,274,116 B2 * | 9/2007 | Inoue | H02J 7/0065 | 307/100 |
| 7,782,030 B2 * | 8/2010 | Ryu | H02M 1/40 | 323/268 |
| 7,902,692 B2 * | 3/2011 | Darroman | B60L 11/1861 | 307/10.1 |
| 7,932,634 B2 * | 4/2011 | Bourilkov | H02J 7/34 | 307/46 |
| 7,969,121 B2 * | 6/2011 | Smith | H02M 3/1582 | 320/167 |
| 7,977,819 B2 * | 7/2011 | Kitanaka | B60L 9/22 | 307/64 |
| 8,044,536 B2 * | 10/2011 | Nguyen | H02J 1/08 | 307/32 |
| 8,089,253 B2 * | 1/2012 | Murtojarvi | H03F 1/0211 | 323/224 |
| 8,248,044 B2 * | 8/2012 | Brown | H02M 3/1588 | 323/224 |
| 8,256,547 B2 * | 9/2012 | Ichikawa | B60K 6/365 | 180/65.265 |
| 8,267,207 B2 * | 9/2012 | Ichikawa | B60K 6/365 | 180/65.1 |
| 8,339,115 B2 * | 12/2012 | Brown | H02M 3/1588 | 323/224 |
| 8,368,252 B2 * | 2/2013 | Pabon | H02M 7/219 | 307/31 |
| 8,384,367 B2 * | 2/2013 | Murakami | H02J 7/0065 | 323/225 |
| 8,400,014 B2 * | 3/2013 | Li | H02J 7/0068 | 307/48 |
| 8,401,500 B1 * | 3/2013 | Bauder | G06F 1/26 | 330/127 |
| 8,497,598 B2 * | 7/2013 | Darroman | B60L 11/1861 | 307/10.1 |
| 8,508,066 B2 * | 8/2013 | Lee | B60L 11/1803 | 307/10.1 |
| 8,508,208 B2 * | 8/2013 | Klein | H02M 3/1582 | 323/282 |
| 8,659,279 B2 * | 2/2014 | George | H02M 1/32 | 323/272 |
| 8,723,489 B2 * | 5/2014 | Parakulam | H02M 3/1582 | 323/259 |
| 8,816,641 B2 * | 8/2014 | Andrea | H02J 7/022 | 320/111 |
| 9,047,075 B1 * | 6/2015 | Lee | H02J 9/061 | |
| 9,047,076 B1 * | 6/2015 | Lee | G06F 1/30 | |
| 9,423,817 B2 * | 8/2016 | Sakakibara | H02M 3/158 | |
| 9,444,280 B2 * | 9/2016 | Lee | H02J 9/061 | |
| 9,479,056 B2 * | 10/2016 | Parakulam | H02M 3/1582 | |
| 9,516,711 B2 * | 12/2016 | Weil | H05B 33/0818 | |
| 2006/0006850 A1 * | 1/2006 | Inoue | H02J 7/0065 | 323/265 |
| 2006/0119322 A1 * | 6/2006 | Maleki | H01M 10/486 | 320/150 |
| 2006/0220570 A1 * | 10/2006 | Evans | H05B 33/0803 | 315/86 |
| 2007/0182490 A1 * | 8/2007 | Hau | H03F 1/0227 | 330/297 |
| 2008/0129219 A1 * | 6/2008 | Smith | H02M 3/1584 | 315/291 |
| 2008/0218130 A1 * | 9/2008 | Guo | H01M 10/441 | 320/162 |
| 2009/0096288 A1 * | 4/2009 | Nguyen | H02J 1/08 | 307/31 |
| 2009/0322148 A1 * | 12/2009 | Kitanaka | B60L 9/22 | 307/9.1 |
| 2011/0080143 A1 * | 4/2011 | Parakulam | H02M 3/1582 | 320/162 |
| 2011/0163601 A1 * | 7/2011 | Li | H02J 7/0068 | 307/48 |
| 2012/0013196 A1 * | 1/2012 | Kim | H02J 1/12 | 307/82 |
| 2012/0139500 A1 * | 6/2012 | Ye | H02J 7/0068 | 320/135 |
| 2012/0139501 A1 * | 6/2012 | Cintra | H01M 10/052 | 320/137 |
| 2012/0176090 A1 * | 7/2012 | Andrea | H02M 7/797 | 320/128 |
| 2013/0221921 A1 * | 8/2013 | Ang | B60L 11/1811 | 320/109 |
| 2014/0084847 A1 * | 3/2014 | Tseng | H02J 7/00 | 320/107 |
| 2014/0266013 A1 * | 9/2014 | Becker | H02J 7/007 | 320/107 |
| 2014/0266096 A1 * | 9/2014 | Parakulam | H02M 3/1582 | 323/271 |
| 2015/0112578 A1 * | 4/2015 | Sakakibara | B60R 16/03 | 701/113 |
| 2015/0207347 A1 * | 7/2015 | Hori | H01M 10/482 | 320/118 |
| 2015/0274099 A1 * | 10/2015 | Boucly | H02M 1/08 | 307/10.1 |
| 2015/0298566 A1 * | 10/2015 | Srinivasan | H02J 1/108 | 320/101 |
| 2015/0314387 A1 * | 11/2015 | Starzengruber | B23K 9/09 | 219/130.33 |
| 2015/0380968 A1 * | 12/2015 | Lee | H02J 9/061 | 713/300 |
| 2016/0016483 A1 * | 1/2016 | Yasunori | B60L 11/14 | 320/162 |
| 2016/0049817 A1 * | 2/2016 | Karlsson | B25F 5/00 | 173/1 |
| 2016/0072331 A1 * | 3/2016 | Ye | H02J 7/0068 | 320/135 |
| 2016/0193929 A1 * | 7/2016 | Sakakibara | H02M 3/156 | 307/10.1 |
| 2017/0047845 A1 * | 2/2017 | Parakulam | H02M 3/1582 | |

FOREIGN PATENT DOCUMENTS

| | | |
|---|---|---|
| JP | 08-140286 | 5/1996 |
| JP | 2003-047238 | 2/2003 |
| JP | 2004-260955 | 9/2004 |
| JP | 2013-55849 | 3/2005 |
| JP | 2007-529185 | 10/2007 |
| JP | 2010-088220 | 4/2010 |
| JP | 2011-223755 | 11/2011 |
| JP | 2012-5235 | 1/2012 |

(56) References Cited

FOREIGN PATENT DOCUMENTS

| | | |
|---|---|---|
| JP | 2013-034072 | 2/2013 |
| JP | 2013-258882 | 12/2013 |
| JP | 2013258882 A * | 12/2013 |

* cited by examiner

METHOD FOR SUPPLYING POWER TO A LOAD WITHIN A PORTABLE ELECTRONIC DEVICE

PRIORITY CLAIM

The present application claims benefit of priority under 35 U.S.C. §§120, 365 to the previously filed Japanese Patent Application No. JP2014-089019 with a priority date of Apr. 23, 2014, which is incorporated by reference herein.

BACKGROUND OF THE INVENTION

1. Technical Field

The present invention relates to power systems included within portable electronic devices in general, and particularly to a power system capable of efficiently discharging electricity of a battery to a load within a portable electronic device.

2. Description of Related Art

A rechargeable battery, such as a lithium-ion battery, has a discharge cutoff voltage. The amount of electricity discharged from a full-charge state of a battery down to a discharge cutoff voltage defines the capacity of the battery at that time. A portable electronic device, such as a laptop personal computer, a tablet, or a smartphone, is configured to supply power of its battery to a DC/DC converter. The DC/DC converter then converts an input voltage to a predetermined output voltage, and supplies power to the portable electronic device.

In recent years, portable electronic devices have decreased the number of battery cells connected in series, such as one or two, meaning that the rated voltage output from the batteries is lowered. A DC/DC converter has an acceptable minimum voltage set relative to the input voltage, and when the output voltage of the battery falls below the acceptable minimum voltage, electricity supplied from the battery has to be stopped.

The present disclosure provides a power system for efficiently supplying electrical power from a battery to a load within a portable electronic device.

SUMMARY OF THE INVENTION

In accordance with a preferred embodiment of the present invention, a power system includes a charge booster, a direct discharge circuit and a rechargeable battery. The rechargeable battery supplies power to a load within a portable electronic device. The charge booster boosts an output voltage of the rechargeable battery for supplying power to the load. The direct discharge circuit supplies power to the load from the rechargeable battery without passing through the charge booster.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
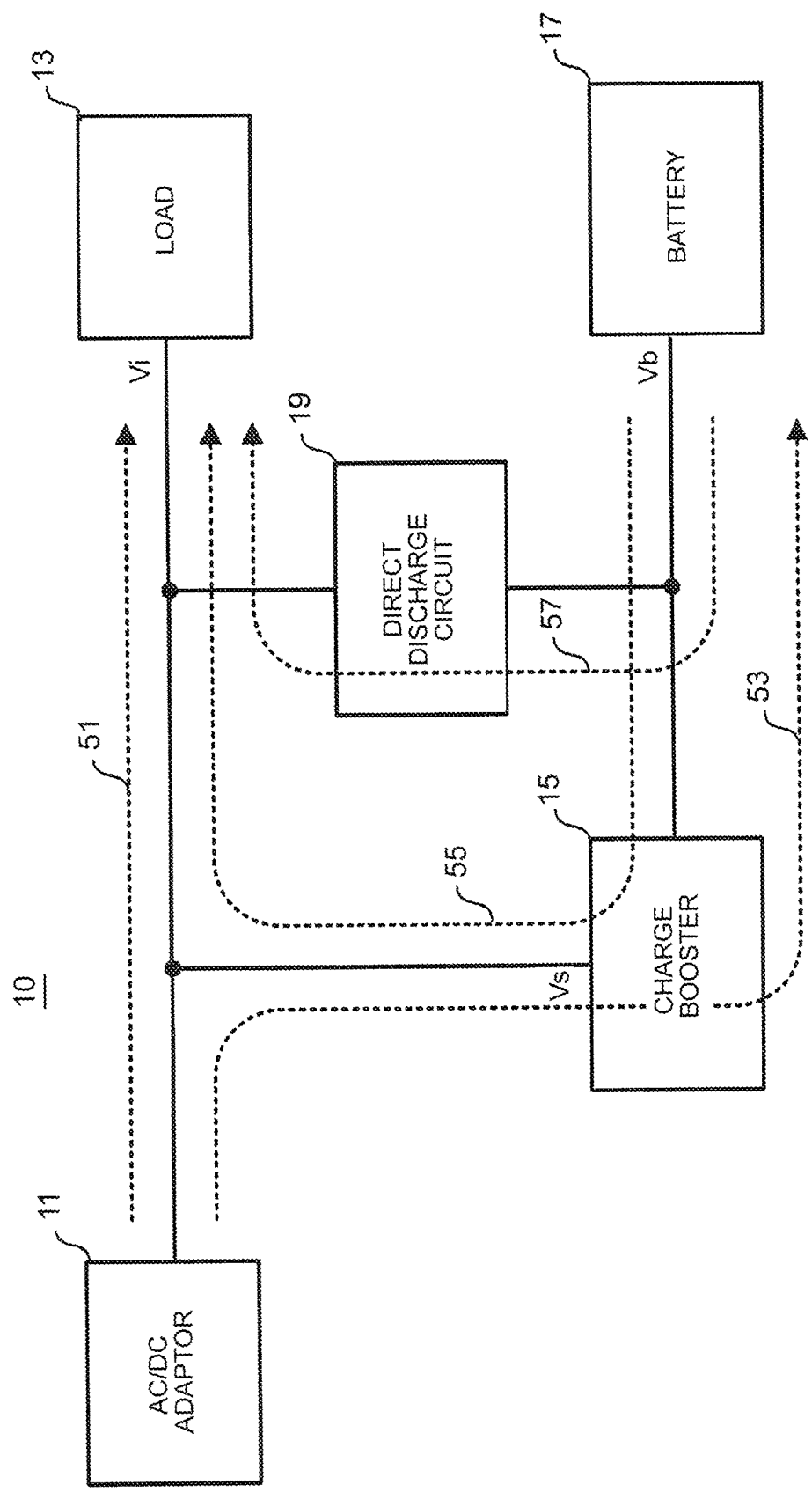
FIG. 1 is a block diagram of a power system.

FIG. 1 is a block diagram of a power system 10, in accordance with a preferred embodiment of the present invention. The power system 10 may be installed in a portable electronic device, such as a laptop personal computer (laptop PC), a tablet or a smartphone. The power system 10 is generally applicable to portable electronic devices that need to consume the electricity stored in a rechargeable battery 17 to reach discharge cutoff voltage.

The power system 10 includes an AC/DC adaptor 11, a charge booster 15, a direct discharge circuit 19, and a battery 17. The AC/DC adaptor 11 converts AC voltage to a predetermined DC voltage to supply system power to a load 13 via an external power-supply route 51 and to supply charge power to the charge booster 15 via a charge route 53. The load 13 is a device, such as a processor, a display, or a memory making up a portable electronic device, and operates while receiving power from the AC/DC adaptor 11 or the battery 17. Power consumption of the load 13 may increase rapidly for only a short time.

The load 13 typically includes a converter that converts the output voltage of the AC/DC adaptor 11 into a predetermined voltage. The following describes the operation of the power system 10 in the state where the load 13 consumes power. The load 13 operates normally in the range of input voltage Vi from acceptable maximum voltage to acceptable minimum voltage. As the battery 17 discharges, cell voltage Vb decreases from the voltage in the full charge state to the discharge cutoff voltage. Herein such discharge cutoff voltage is specified from the viewpoint of protection of batteries, at which discharge has to be stopped because deterioration becomes remarkable if discharge is continued beyond the voltage. When the acceptable minimum voltage is lower than the value obtained by subtracting, from the discharge cutoff voltage of the battery 17, voltage drop due to the impedance of the route through which the direct discharge circuit 19 and the battery 17 discharge, then discharge cannot be performed to the discharge cutoff voltage as long as power is supplied directly from the battery 17 to the load 13.

The charge booster 15 may include a switching regulator that shifts to one of the operation modes of an active mode and a stop mode. When the AC/DC adaptor 11 supplies power, the charge booster 15 is set at the active mode or the stop mode in accordance with the charge state of the battery 17. When the charge booster 15 is set at the active mode, then the charge booster performs charge operation so as to charge the battery 17 through the charge route 53. When the charge booster 15 is set at the stop mode, then the charge booster stops the operation completely.

When the AC/DC adaptor 11 does not supply power, the charge booster 15 shifts to the active mode or the stop mode in accordance with the magnitude of the input voltage Vi of the load or the output voltage Vs of the charge booster 15. The charge booster 15, shifting to the active mode, performs switching operation (boosting operation) to boost the cell voltage Vb only when the input voltage Vi or the output voltage Vs decreases to a predetermined value. The charge booster 15 supplies power to the load 13 via a boosting/discharge route 55 while keeping the input voltage Vi at a predetermined value. The charge booster 15, shifting to the active mode, stops switching operation when the input voltage Vi or the output voltage Vs is a predetermined value or more. When the charge booster 15 in the active mode stops the switching operation, the charge booster stands by for starting of the switching operation, meaning that standby power increases compared with the stop mode.

The direct discharge circuit 19 is set at one of the modes including a through mode that directly connects the battery 17 and the load 13 and a block mode for disconnection. The direct discharge circuit 19 is set at the block mode when the AC/DC adaptor 11 supplies power, and is set at the through mode, or the block mode in conjunction with the operation of the charge booster 15 when the AC/DC adaptor does not supply power. When the direct discharge circuit 19 is set at the through mode, then power is supplied to the load 13 via a direct discharge route 57, and when it is set at the block mode, the direct discharge circuit blocks short-circuit current flowing through the charge booster 15 that operates for boosting or the AC/DC adaptor 11.

Figure 2:
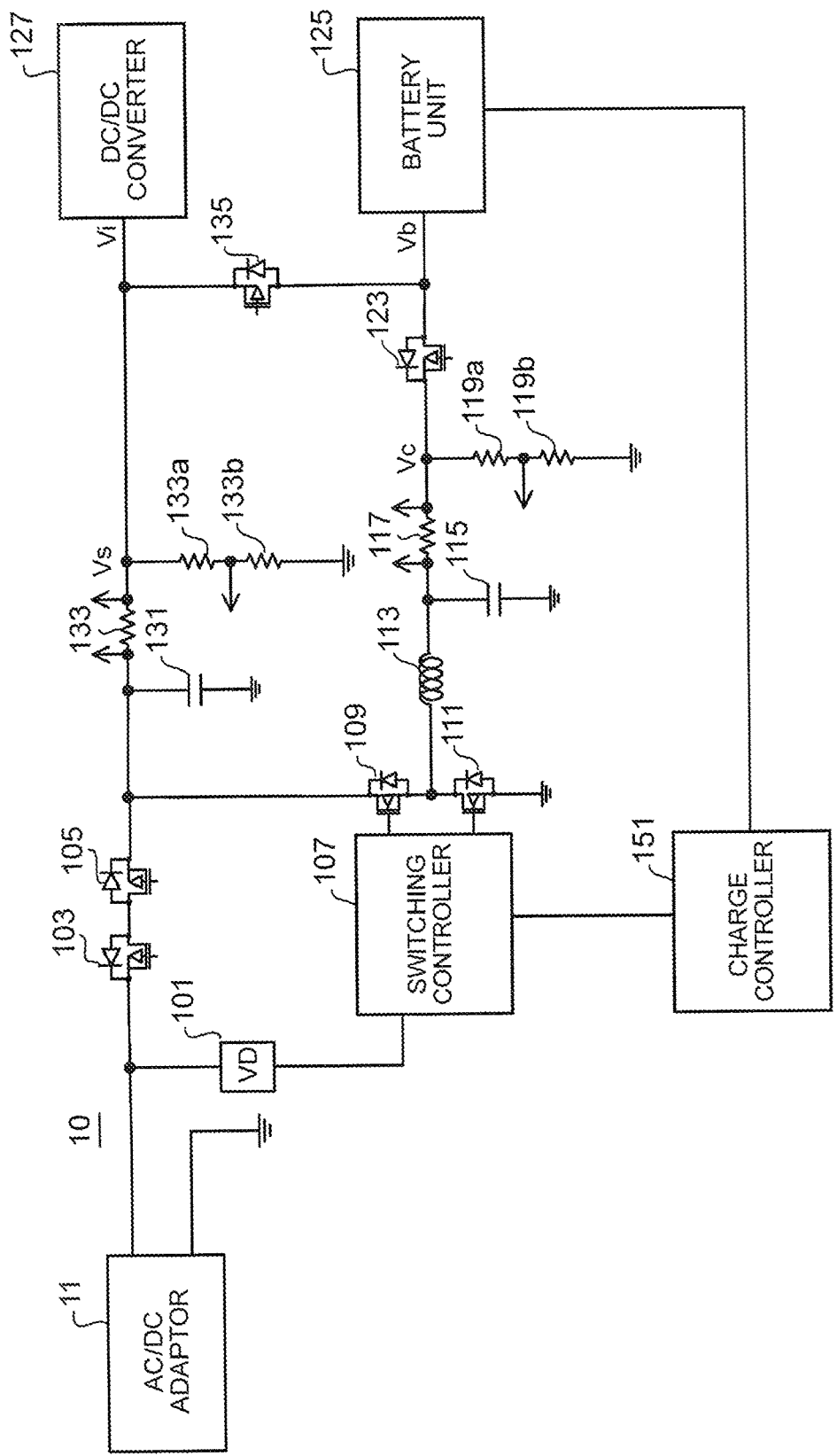
FIG. 2 is a functional block diagram of the power system from FIG. 1.

FIG. 2 is a functional block diagram describing an exemplary configuration of the power system 10. The AC/DC adaptor 11 may be a built-in type that is stored internally of a chassis of the portable electronic device, or may be of an external type configured to be connected to the chassis via a connector. A switching controller 107, a high-side FET 109, a low-side FET 111, a reactor 113 and smoothing capacitors 115 and 131 make up the switching regulator, which corresponds to the charge booster 15 in FIG. 1. The FETs 109 and 111 correspond to rectifiers (switching devices) to let current flow through in a constant direction, and the reactor 113 corresponds to a passive device that stores or releases energy of the power supply in response to the operation of the FETs 109 and 111. Then the smoothing capacitors 115 and 131 correspond to filter devices to stabilize voltage.

A DC/DC converter 127 converts the input voltage Vi to predetermined stable voltage, and supplies power to a device making up the portable electronic device. The DC/DC converter 127 corresponds to the load 13 in FIG. 1. A battery unit 125 includes the battery 17 in FIG. 1, a protection circuit, a control circuit, an input/output circuit and the like. The battery unit 125 may be a battery pack complying with smart battery specifications, which is installed in a chassis bay of the portable electronic device. The present specification exemplifies a lithium-ion battery as the battery 17, and the present invention is applicable of every rechargeable battery having discharge cutoff voltage.

Between the AC/DC adaptor 11 and the DC/DC converter 127, FETs 103 and 105 and a sense resistor 133 are connected in series. Both ends of the sense resistor 133 are connected to the switching controller 107 to detect input current of the DC/DC converter 127. Between the AC/DC adaptor 11 and the FET 103, a voltage detector (VD) 101 is connected to detect voltage of the AC/DC adaptor 11.

The output of the VD 101 is connected to the switching controller 107. Between the FET 105 and the sense resistor 133, one end of the smoothing capacitor 131 is connected, and the other end thereof is connected to the ground. Between the sense resistor 133 and the DC/DC converter 127, one end of voltage-dividing resistors 133a and 133b connected in series is connected, and the other end thereof is connected to the ground, so as to allow the switching controller 107 to detect the output voltage Vs.

The connecting part of the voltage-dividing resistors 133a and 133b is connected to the switching controller 107. The switching controller 107 detects the output voltage Vs as feedback voltage. Since voltage drop in the line is small, the output voltage Vs of the switching controller 107 for boosting operation and the input voltage Vi can be considered as substantially the same value. Between the FET 105 and the sense resistor 133, one end of the FETs 109 and 111 connected in series is connected, and the other end thereof is connected to the ground. The switching controller 107 makes the FET 109 and the FET 111 perform switching operation in a synchronous rectification manner for boosting operation (discharge operation) or buck operation (charge operation). The synchronous rectification manner is such that ON/OFF states of the FET 109 and the FET 111 are switched alternately so that their simultaneous OFF duration is overlapped.

Between the connecting part of the FETs 109 and 111 and the battery unit 125, the reactor 113, a sense resistor 117 and a FET 123 are connected in series. Both ends of the sense resistor 117 are connected to the switching controller 107 so as to detect charge current. Between the reactor 113 and sense resistor 117, one end of the smoothing capacitor 115 is connected, and the other end thereof is connected to the ground. Between the sense resistor 117 and the FET 123, one end of voltage-dividing resistors 119a and 119b connected in series is connected, and the other end thereof is connected to the ground, so as to allow the switching controller 107 to detect the output voltage Ve. The connecting part of the voltage-dividing resistors 119a and 119b is connected to the switching controller 107. The switching controller 107 detects the output voltage Vc as feedback voltage. Since voltage drop in the line is small, the output voltage Ve and the cell voltage Vb can be considered as substantially the same value.

The switching controller 107 controls the ON/OFF period of the FETs 109 and 111 in a PWM manner, for example. During the boosting operation, as the ON duration of the FET 111 increases, more energy is stored in the reactor 113 and so the output voltage Vs increases. Similarly during the buck operation, as the ON duration of the FET 109 increases, more energy is stored in the reactor 113, and so the output voltage Vc increases.

The reactor 113 repeats storage and release of energy for both of the boosting operation and the buck operation. The switching controller 107 has a setting value for the boosting operation (boosting voltage) and a setting value for the buck operation (charge voltage and charge current). In order to keep the output voltage Vs at the boosting voltage during the boosting operation, the switching controller 107 refers to the output voltage Vs detected by the voltage-dividing resistors 133a and 133b to adjust the duty of the switching operation. In order to keep the output voltage Vc at the charge voltage during the buck operation, the switching controller 107 refers to the output voltage Vc detected by the voltage-dividing resistors 119a and 119b to adjust the duty of the switching operation. During the buck operation, the switching controller 107 performs switching control of the FETs 109 and 111 in a constant-voltage/constant-current manner and charges the battery unit 125.

The input terminal of the DC/DC, converter 127 and the output terminal of the battery unit 125 are connected via a FET 135. The FET 135 corresponds to the direct discharge circuit 19 in FIG. 1. While the AC/DC adaptor 11 supplies power, the FET 135 is controlled by a charge controller 151 to be in the OFF state. While the AC/DC adaptor 11 does not supply power, the FET 135 is controlled by the switching controller 107.

The battery unit 125 is connected to the charge controller 151 via a SM bus, for example. The charge controller 151 is connected to the switching controller 107. The charge controller 151 monitors the output voltage of the AC/DC adaptor 11 via the switching controller 107. The charge controller 151 acquires information such as the cell voltage Vb, the amount of electricity stored in the battery cell and a setting value set for the switching controller 107, for example, from the battery unit 125 regularly via the SM bus.

The switching controller 107 operates at one of the modes of the active mode and the stop mode. The switching controller 107 set at the active mode can perform switching operation or stop the switching operation in accordance with the values of the output voltage Vs and Vc. While the AC/DC adaptor 11 supplies power, the charge controller 151 sets the switching controller 107 at the active mode or the stop mode. When the switching controller 107 at the active mode and does not perform boosting operation, then it stops the switching operation of the FETs 109 and 111 similarly to at the stop mode, but the switching controller 107 at the active mode consumes stand-by power.

On the other hand, the switching controller 107 at the stop mode hardly consumes stand-by power because most of the functions stop except for a circuit for waking. In response to a charge request from the battery unit 125, the charge controller 151 sets the switching controller 107 at the active mode, and sets charge current and charge voltage for immediate charge operation. In response to a charge-stop request from the battery unit 125, the charge controller 151 sets the switching controller 107? at the stop mode. The charge controller 151 controls the operation of the FETs 103, 105, 123 and 135 in accordance with the output voltage of the AC/DC adaptor 11.

Figure 3:
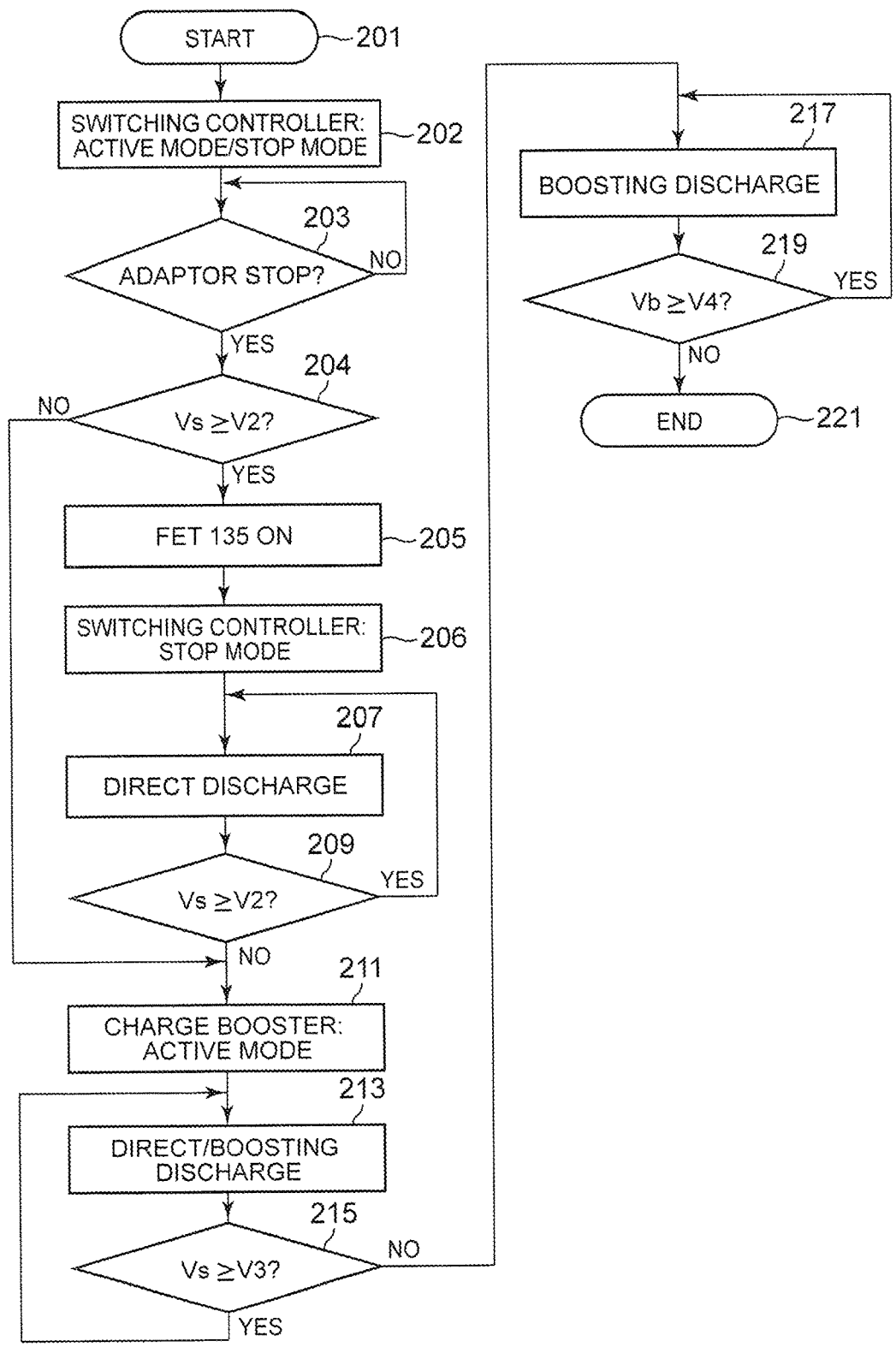
FIG. 3 is a flow diagram of the operational process of the power system from FIG. 1.
Figure 4:
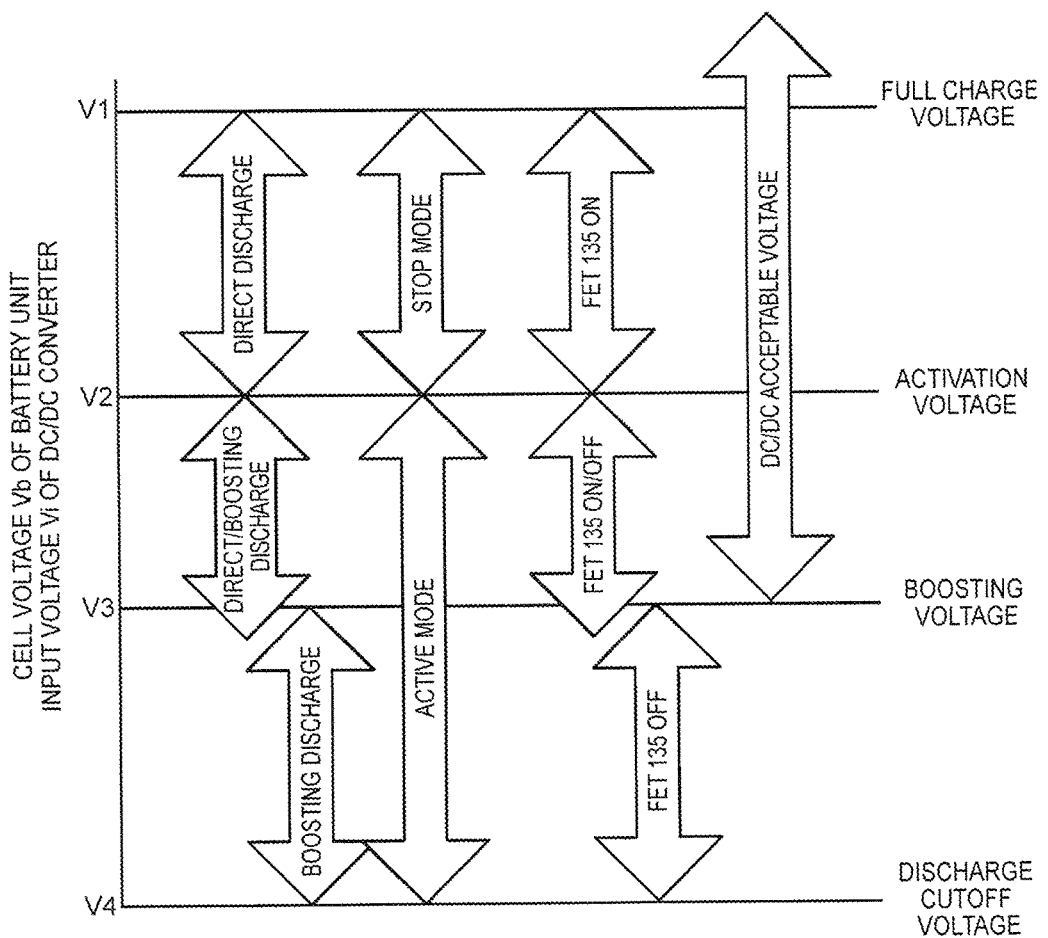
FIG. 4 describes the relationship among the operating state of a switching controller, the operating state of a transistor, the operating state of the power system from FIG. 1, and the acceptable voltage of the DC/DC converter.

FIG. 3 is a flowchart describing the operation of the power system 10, and FIG. 4 describes the relationship among the operating state of the switching controller 107, the operating state of the FET 135, the operating state of the power system 10, and the acceptable voltage of the DC/DC converter 127. In FIG. 4, the vertical axis represents the input voltage Vi of the DC/DC converter 127 or the cell voltage Vb of the battery unit 125.

This exemplifies the case where the battery unit 125 outputs cell voltage Vb corresponding to one battery, and when a plurality of battery cells are connected in series, the synthesized voltage therefrom may be used. V1 denotes the full charge voltage of the battery unit 125, which may be 4.2 V to 4.35 V per one cell, for example. V2 denotes voltage at which the switching controller 107 shifts to the active mode (activation voltage) when the AC/DC adaptor 11 does not supply power, which is 3.5 V, for example.

V3 denotes setting voltage (boosting voltage) when the switching controller 107 performs boosting operation, which is set at 3.0 V, for example. This exemplifies the case where the boosting voltage V3 agrees with the acceptable minimum voltage of the DC/DC converter 127, and the acceptable minimum voltage may be smaller than the boosting voltage V3. Note here that as the boosting voltage V3 becomes larger than the acceptable minimum voltage, the time for switching operation of the switching controller 107 correspondingly increases, and so loss increases.

V4 denotes the discharge cutoff voltage of the battery cell, which is 2.5 V to 2.75 V, for example. Note that when multiple battery cells included in the battery unit 125 are connected in series, the values of V1 to V4 will be those multiplied by the number of the battery cells, respectively. At block 201, the AC/DC adaptor 11 in the power system 10 supplies power to the DC/DC converter 127. At block 202, it is assumed that the charge controller 151 initially sets the switching controller 107 at the stop mode. The charge controller 151 detects the output voltage of the AC/DC adaptor 11, and controls the FETs 103 and 105 ON and the FETS 123 and 135 OFF.

The charge controller 151 acquires, from the battery unit 125, information indicating the charge stage of the battery cell regularly, and when it determines the necessity of charge, the charge controller controls the FET 123 ON and sets the switching controller 107 at the active mode. The charge controller 151 further sets charge voltage and charge current for the switching controller 107 to start charge operation. When the full charge is reached, the charge controller 151 sets the switching controller 107 at the stop mode.

At block 203, the AC/DC adaptor 11 stops supplying of power. At the moment of the stopping, the switching controller 107 is set at the active mode or the stop mode. The cell voltage Vb of the battery unit 125 has any value from the full charge voltage V1 to the discharge cutoff voltage V4. Detecting the output of the VD 101, the switching controller 107 recognizes the AC/DC adaptor 11 stopping the supply of power. At block 204, when the switching controller 107 determines that the output voltage Vs is larger than the activation voltage V2, then the switching controller sets the FET 135 ON at block 205.

As a result, the power supply for the DC/DC converter 127 switches from the AC/DC adaptor 11 to the battery unit 125. During the transitional duration before the FET 135 is controlled to be ON, parasitic diode of the FET 135 flows current to keep the input voltage Vi of the DC/DC converter 127. When the switching controller 107 determines that the output voltage Vs is smaller than the activation voltage V2, the procedure shifts to block 211.

At block 206, the switching controller 107 shifts to the stop mode. At block 207, in this state, the battery unit 125 supplies power via the FET 135. While power is supplied to the DC/DC converter 127, the switching controller 107 stops, meaning that current does not flow through the reactor 113, whereby power loss and voltage drop can be suppressed. Discharge from the battery unit 125 to the DC/DC converter 127 via the FET 135 is referred to as direct discharge.

During the direct discharge, if the load of the DC/DC converter 127 increases rapidly at a short period, the cell voltage Vb of the battery unit 125 decreases due to the internal resistance for that duration only, and voltage dip occurs, where the input voltage Vi temporarily drops due to resistance along the route leading to the DC/DC converter 127, such as FETs and a fuse in the battery unit 125, the FET 135 and the like. Then the activation voltage V2 is set so as to include margin allowing the boosting voltage V3 to be kept even when such voltage dip occurs for the boosting voltage V3. Then, the input voltage Vi does not decrease to less than the acceptable minimum voltage of the DC/DC converter 127 even without performing the boosting operation of the switching controller 107 when voltage dip occurs due to fluctuation in load before the input voltage Vi decreases to the activation voltage V2.

At block 209, when the switching controller 107 detects the input voltage Vi of the DC/DC converter 127 that is less than the activation voltage V3, then the switching controller 107 shifts to the active mode. The switching controller 107, shifting to the active mode, performs switching operation only when the output voltage Vs becomes less than the boosting voltage V3.

The output voltage Vs becomes less than the boosting voltage V3 only when voltage dip occurs during the high cell voltage Vb state. When the switching controller 107 detects the output voltage Vs becoming less than the boosting voltage V3, the switching controller 107 makes the FETs 109 and 111 perform switching operation for boosting operation. At this time, energy of the current flowing when the FET 111 is ON and the FET 109 is OFF is stored in the reactor 113. Next, when the FET 109 is ON and the FET 111 is OFF, induced electromotive force resulting from the energy released from the reactor 113 is superimposed to the cell voltage Vb of the battery unit 125, so that the cell voltage Vb of the battery unit 125 is boosted to the boosting voltage V3, and so power is supplied to the DC/DC converter 127. Discharge from the battery unit 125 to the DC/DC converter 127 via the switching controller 107 performing boosting operation is referred to as boosting charge.

The switching controller 107 controls the switching period in a PWM manner to boost the output voltage Vs to the boosting voltage V3. During the switching operation, the switching controller 107 controls the FET 135 OFF. When the output voltage Vs reaches the boosting voltage V3, then the switching controller 107 stops the switching operation, and controls the FET 135 ON. During the time when the cell voltage Vb of the battery unit 125 decreases from the activation voltage V2 to the boosting voltage V3, the switching controller 107 repeats boosting operation and stopping while controlling the FET 135 in response to the occurrence of voltage dip. This can be said, from the viewpoint of the power system 10, repetition of boosting charge and direct charge.

Figure 5:
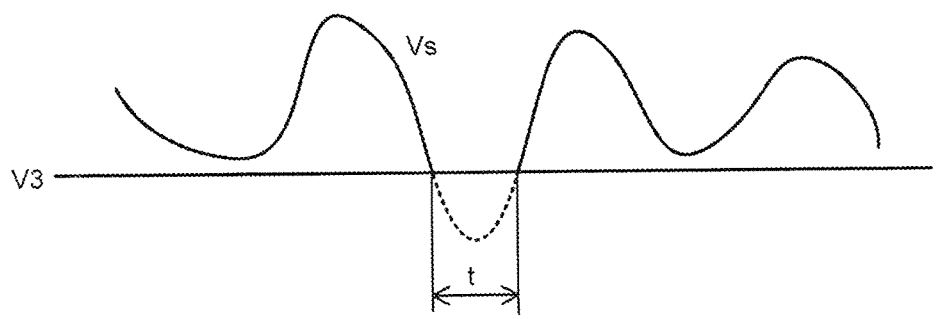
FIG. 5 describes the state where the power system from FIG. 1 keeps an input voltage in response to a voltage dip.

FIG. 5 illustrates the state where, assuming that direct discharge is continued, voltage dip occurs and so the switching controller 107 performs boosting operation only for the time t when the output voltage Vs decreases lower than the boosting voltage V3 to boost the output voltage Vs to the boosting voltage V3. While the cell voltage Vb of the battery unit 125 decreases from the activation voltage V2 to the boosting voltage V3, switching operation stops and power is supplied by direct discharge at many time zones without occurrence of voltage dip, in spite of the switching controller 107 shifting to the active mode.

If the PET 135 is not provided, then after the cell voltage Vb falls below the activation voltage V2, the switching controller 107 will perform boosting operation continuously for countermeasure for voltage dip. Although switching loss of the switching controller 107 and power loss at the reactor 113 occur during boosting charge, such loss will not occur during direct discharge, and so it is advantageous to lengthen the duration of direct discharge as long as possible while keeping the input voltage Vi.

The FET 135 will repeat the OFF state and the ON state in conjunction with the switching operation of the FETs 109 and 111. At block 213, boosting discharge and direct discharge take place in this way. At block 215, when the output voltage Vs reaches less than the boosting voltage V3, the switching controller 107 automatically performs continuous boosting operation. The switching controller 107 accordingly controls the FET 135 OFF continuously, and at block 217, the power system 10 performs complete boosting discharge.

At block 219, the charge controller 151 determines that the battery unit 125 reaches the discharge cutoff voltage V4 based on the remaining capacity and the cell voltage Vb received from the battery unit 125. At block 221, the charge controller 151 informs the system of stopping power supply, and sets the switching controller 107 at the stop mode.

As has been described, the present disclosure provides an improved power for efficiently supplying electrical power from a battery to a load within a portable electronic device.

While the disclosure has been particularly shown and described with reference to a preferred embodiment, it will be understood by those skilled in the art that various changes in form and detail may be made therein without departing from the spirit and scope of the disclosure.

What is claimed is:

1. A power system comprising:
   a rechargeable battery for supplying power to a load within a portable electronic device;
   a charge booster configured to boost said rechargeable battery's output voltage to said load; and
   a direct discharge circuit, operates in conjunction with said charge booster, configured to supply power to said load from said rechargeable battery without passing through said charge booster, wherein
   power is supplied from said rechargeable battery to said load via said direct discharge circuit when said input voltage of said load is above an activation voltage,
   power is supplied from said rechargeable battery to said load via said direct discharge circuit and said charge booster when said input voltage of said load falls below said activation voltage but above a boosting voltage, and
   power is supplied from said rechargeable battery to said load via said charge booster when said input voltage of said load falls below said boosting voltage but above a discharge cutoff voltage.

2. The power system of claim 1, wherein said charge booster includes a switching regulator having a rectifier that performs switching operation, and a switching controller that controls said rectifier.

3. The power system of claim 2, wherein said switching regulator charges said rechargeable battery with power supplied by an AC/DC adaptor.

4. The power system of claim 2, wherein said direct discharge circuit includes a bypass switch that operates in conjunction with switching operation of said rectifier.

5. The power system of claim 4, wherein said bypass switch shifts to an ON state when said input voltage of said load reaches a full charge voltage such that said switching controller can stop its operation.

6. The power system of claim 5, wherein said switching controller performs said switching operation to boost said output voltage of said rechargeable battery when said input voltage of said load is less than said activation voltage that is lower than said full charge voltage.

7. The power system of claim 6, wherein said switching controller controls said bypass switch to be in an OFF state when said rectifier performs switching operation, and said switching controller controls said bypass switch to be in an ON state when said rectifier stops switching operation.

8. A portable electronic device comprising:
   a load;
   a rechargeable battery supplies power to said load when an AC/DC adaptor is not supplying power to said load;
   a charge booster configured to boost said rechargeable battery's output voltage to said load; and
   a direct discharge circuit, operates in conjunction with said charge booster, configured to supply power to said load from said rechargeable battery without passing through said charge booster, wherein power is supplied from said rechargeable battery to said load via said direct discharge circuit when said input voltage of said load is above an activation voltage, power is supplied from said rechargeable battery to said load via said direct discharge circuit and said charge booster when said input voltage of said load falls below said activation voltage but above a boosting voltage, and power is supplied from said rechargeable battery to said load via said charge booster when said input voltage of said load falls below said boosting voltage but above a discharge cutoff voltage.

9. The portable electronic device of claim 8, wherein said portable electronic device further includes a charge route having a part of said boosting/discharge route, through which said rechargeable battery is charged with power from said AC/DC adaptor.

10. The portable electronic device of claim 9, wherein said portable electronic device further includes an external power-supply route through which power is supplied to said load from said AC/DC adaptor when power is being supplied to said load through none of said boosting/discharge route and said direct discharge route.

11. A method comprising:
in response to an AC/DC adapter supplying power to a load, setting a switching controller to an active mode to charge a rechargeable battery unit until said rechargeable battery is fully charged;

in response to said AC/DC adaptor not supplying power to said load,
supplying power from said rechargeable battery to said load via a direct discharge when an input voltage of said load is above an activation voltage;
supplying power from said rechargeable battery to said load via said direct discharge and a boosting discharge when said input voltage of said load falls below said activation voltage but above a boosting voltage; and
supplying power from said rechargeable battery to said load via said boosting discharge when said input voltage of said load falls below said boosting voltage but above a discharge cutoff voltage.

12. The method of claim 11, wherein said setting a switching controller further includes setting said switching controller to a stop mode to stop charging said rechargeable battery unit when said rechargeable battery is fully charged.

13. The method of claim 11, wherein said method further includes stopping power supply from said rechargeable battery to said load when said input voltage of said load reaches said discharge cutoff voltag.

14. The method of claim 11, wherein said method further includes charging said rechargeable battery by a switching regulator when power is being supplied from an AC/DC adaptor.

* * * * *